(12) United States Patent
Kim et al.

(10) Patent No.: US 11,183,332 B2
(45) Date of Patent: Nov. 23, 2021

(54) MULTILAYER ELECTRONIC COMPONENT

(71) Applicant: SAMSUNG ELECTRO-MECHANICS CO., LTD., Suwon-si (KR)

(72) Inventors: Dong Yeong Kim, Suwon-si (KR); Woo Chul Shin, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 31 days.

(21) Appl. No.: 16/834,210

(22) Filed: Mar. 30, 2020

(65) Prior Publication Data

US 2021/0082622 A1 Mar. 18, 2021

(30) Foreign Application Priority Data

Sep. 18, 2019 (KR) .................. 10-2019-0114820

(51) Int. Cl.
*H01G 4/232* (2006.01)
*H01G 4/248* (2006.01)
*H01G 4/012* (2006.01)
*H01G 4/30* (2006.01)

(52) U.S. Cl.
CPC .......... *H01G 4/2325* (2013.01); *H01G 4/012* (2013.01); *H01G 4/248* (2013.01); *H01G 4/30* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325
See application file for complete search history.

(56) References Cited

U.S. PATENT DOCUMENTS

| 5,339,068 A * | 8/1994 | Tsunoda ................ H01C 1/02 338/308 |
| 2010/0290172 A1 | 11/2010 | Motoki et al. |
| 2010/0302704 A1 * | 12/2010 | Ogawa ................ H01G 4/2325 361/306.3 |
| 2017/0256359 A1 * | 9/2017 | Masunari ................ H01G 4/30 |
| 2018/0082789 A1 * | 3/2018 | Asano .................... H01G 4/232 |
| 2019/0131076 A1 | 5/2019 | Fukumura |
| 2021/0183581 A1 * | 6/2021 | Nakano .................... H01G 4/30 |

FOREIGN PATENT DOCUMENTS

| JP | H08-203770 A | 8/1996 |
| KR | 10-2010-0124212 A | 11/2010 |
| KR | 10-2010-0129695 A | 12/2010 |
| KR | 10-2019-0049479 A | 5/2019 |

OTHER PUBLICATIONS

Korean Office Action dated Nov. 20, 2020 issued in Korean Patent Application No. 10-2019-0114820 (with English translation).

* cited by examiner

*Primary Examiner* — Michael P McFadden
(74) *Attorney, Agent, or Firm* — Morgan, Lewis & Bockius LLP

(57) ABSTRACT

A multilayer electronic component in the example embodiment includes a Si-organic compound layer including a body covering portion disposed on a region of an exterior surface of a body between external electrodes and an extended portion extending from the body covering portion to a region between a plating layer and an additional plating layer of the external electrode, thereby having improved warpage strength and moisture resistance.

27 Claims, 8 Drawing Sheets

MULTILAYER ELECTRONIC COMPONENT

CROSS-REFERENCE TO RELATED APPLICATION(S)

The application claims the benefit of priority to Korean Patent Application No. 10-2019-0114820 filed on Sep. 18, 2019 in the Korean Intellectual Property Office, the entire disclosure of which is incorporated herein by reference.

BACKGROUND

1. Field

The present disclosure relates to a multilayer electronic component.

2. Description of Related Art

A multilayer ceramic capacitor (MLCC), a multilayer electronic component, is a chip-type condenser mounted on the printed circuit boards of a variety of electronic products including imaging devices, such as a liquid crystal display (LCD), a plasma display panel (PDP), and the like, computers, smartphones, mobile phones, and the like, and may be configured to charge electricity in or discharge electricity from the devices.

A multilayer ceramic capacitor may be used as a component of various electronic devices as a multilayer ceramic capacitor is relatively small in size, may secure high capacity and may be easily mounted. As electronic devices such as computers, mobile devices, and the like, have been designed to have reduced sizes and to operate at high power, there has been increased demand for miniaturization and high capacity of multilayer ceramic capacitors.

Also, recently, there have been increased interest in electrical components, and multilayer ceramic capacitors have been required to have high reliability and high strength properties to be used in vehicles or infotainment systems.

To secure properties of high reliability and high strength, a method of changing an external electrode including a general electrode layer to an external electrode having a dual layer structure including an electrode layer and a conductive resin layer has been suggested.

In the case of a dual layer structure including an electrode layer and a conductive resin layer, a resin composition containing a conductive material may be applied on an electrode layer, and the dual layer structure may absorb external impacts and may prevent permeation of a plating solution, thereby improving reliability.

However, as an electrical vehicle, a self-driving vehicle, and the like, have been developed in the automobile industry, a greater number of multilayer ceramic capacitors have been required, and the multilayer ceramic capacitors used in vehicles are required to guarantee more improved moisture reliability and warpage strength.

SUMMARY

An aspect of the present disclosure is to provide a multilayer electronic component having improved warpage strength properties.

An aspect of the present disclosure is to provide a multilayer electronic component having improved moisture reliability.

An aspect of the present disclosure is to provide a multilayer electronic component having decreased equivalent series resistance (ESR).

According to an aspect of the present disclosure, a multilayer electronic component includes a body including a dielectric layer and first and second internal electrodes alternately stacked with the dielectric layer interposed therebetween, the body including first and second surfaces opposing each other in a stacking direction of the first and second internal electrodes, third and fourth surfaces opposing each other and connected to the first and second surfaces, and fifth and sixth surfaces opposing each other and connected to the first to fourth surfaces; a first external electrode including a first connection portion disposed on the third surface of the body and a first band portion extending from the first connection portion onto at least a portion of each of the first, second, fifth, and sixth surfaces, wherein each of said first connection portion and said first band portion includes a first electrode layer, a first conductive resin layer, a first plating layer, and a first additional plating layer, arranged in order on an exterior of the body; a second external electrode including a second connection portion disposed on the fourth surface of the body and a second band portion extending from the second connection portion onto at least a portion of each of the first, second, fifth, and sixth surfaces, wherein each of said second connection portion and said second band portion includes a second electrode layer, a second conductive resin layer, a second plating layer, and a second additional plating layer, disposed in order on the body; and an Si-organic compound layer including a body covering portion disposed on a region of an exterior surface of the body between the first and second external electrodes, a first extended portion extending from the body covering portion to a region between the first plating layer and the first additional plating layer of the first band portion, and a second extended portion extending from the body covering portion to a region between the second plating layer and the second additional plating layer of the second band portion.

According to an aspect of the present disclosure, a multilayer electronic component includes a body including a dielectric layer and first and second internal electrodes alternately stacked with the dielectric layer interposed therebetween, the body including first and second surfaces opposing each other in a stacking direction of the first and second internal electrodes, third and fourth surfaces opposing each other and connected to the first and second surfaces, and fifth and sixth surfaces opposing each other and connected to the first to fourth surfaces; a first external electrode including a first electrode layer, a first conductive resin layer, a first plating layer, and a first additional plating layer, arranged in order on an exterior of the body, the first external electrode including a first connection portion disposed on the third surface of the body and a first band portion extending from the first connection portion onto at least a portion of each of the first, second, fifth, and sixth surfaces; a second external electrode including a second electrode layer, a second conductive resin layer, a second plating layer, and a second additional plating layer, arranged in order on an exterior of the body, the second external electrode including a second connection portion disposed on the fourth surface of the body and a second band portion extending from the second connection portion onto at least a portion of each of the first, second, fifth, and sixth surfaces; an Si-organic compound layer including a body covering portion disposed on a region of an exterior surface of the body between the first and second external electrodes, a first extended portion extending from the body covering portion to a region between the first plating layer and the first additional plating layer, and a second extended portion extending from the body covering portion to a region between the second plating layer and the second additional plating layer; and first and second openings defined on the first and second extended portions, respectively.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
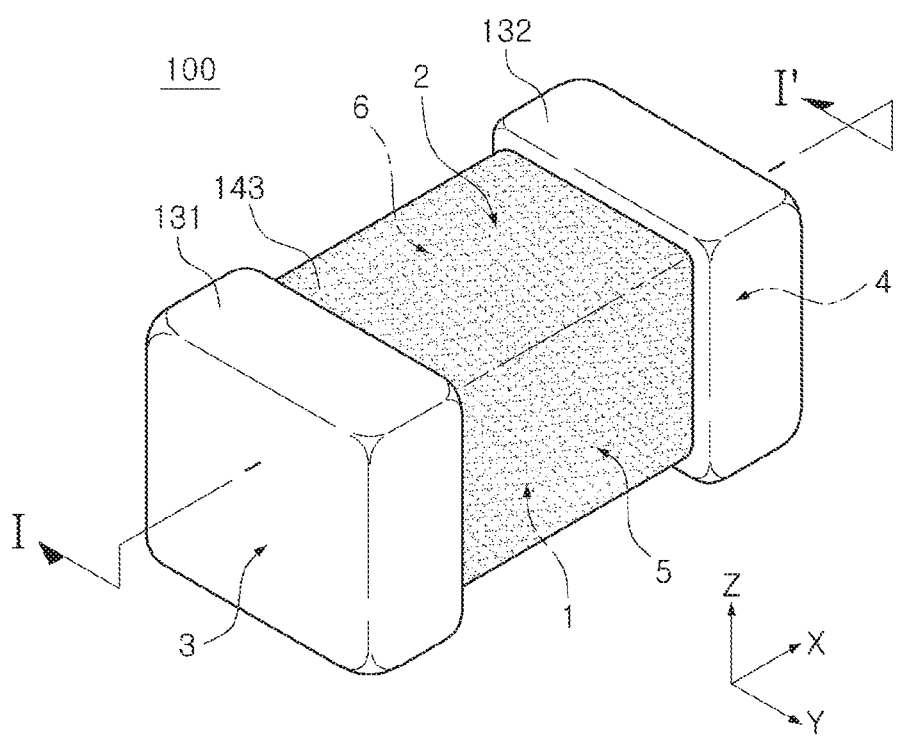
FIG. 1 is a perspective diagram illustrating a multilayer electronic component according to an exemplary embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

In the drawings, certain elements may be omitted to allow the present disclosure to be clearly described, and to clearly express a plurality of layers and areas, thicknesses may be magnified. The same elements having the same function within the scope of the same concept will be described using the same reference numerals. Further, throughout the specification, it will be understood that when a portion "includes" an element, it can further include another element, not excluding another element, unless otherwise indicated.

In the drawing, an X direction is a second direction, an L direction, or a length direction, a Y direction is a third direction, a W direction, or a width direction, and a Z direction is a first direction, a layering direction, a T direction, or a thickness direction.

Multilayer Electronic Component

FIG. 1 is a perspective diagram illustrating a multilayer electronic component according to an exemplary embodiment.

Figure 2:
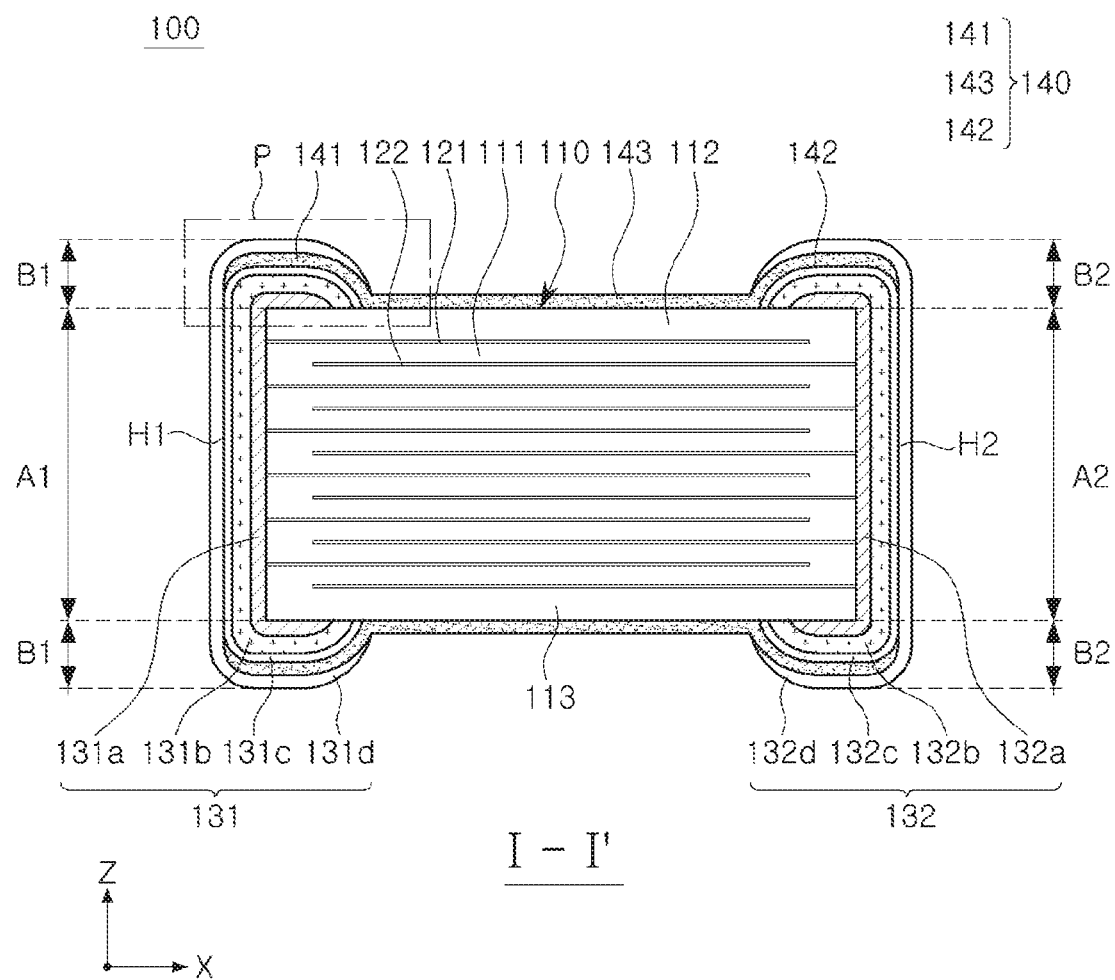
FIG. 2 is a cross-sectional diagram along line I-I' in FIG. 1.

FIG. 2 is a cross-sectional diagram along line I-I' in FIG. 1.

Figure 3:
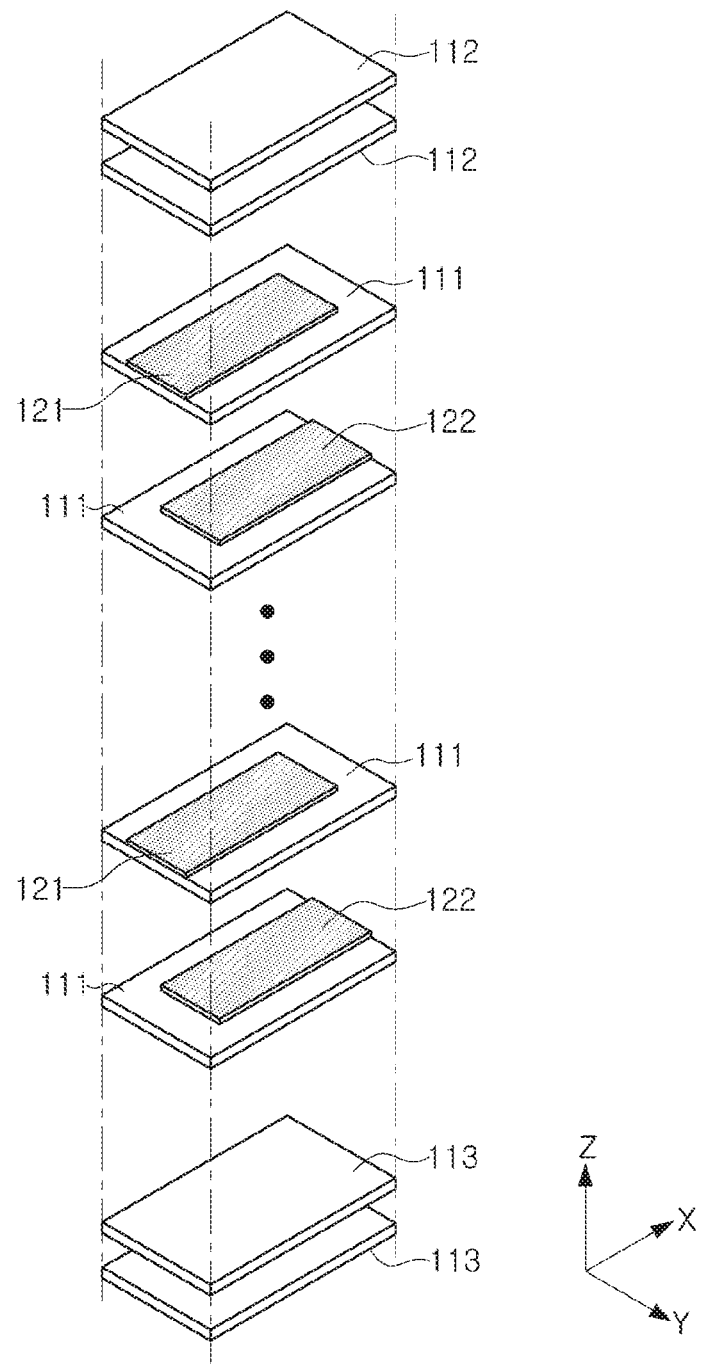
FIG. 3 is an exploded perspective diagram illustrating a body in which a dielectric layer and an internal electrode are stacked according to an exemplary embodiment of the present disclosure.

FIG. 3 is an exploded perspective diagram illustrating a body in which a dielectric layer and an internal electrode are stacked according to an exemplary embodiment.

Figure 4:
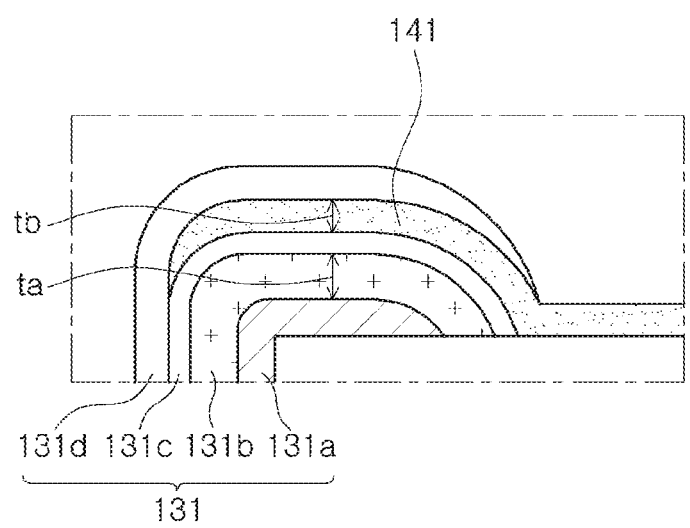
FIG. 4 is an enlarged diagram illustrating region P illustrated in FIG. 2.

FIG. 4 is an enlarged diagram illustrating region P illustrated in FIG. 2.

In the description below, a multilayer electronic component 100 will be described in accordance with an exemplary embodiment with reference to FIGS. 1 to 4.

The multilayer electronic component 100 in the exemplary embodiment may comprise a body 110 including a dielectric layer 111 and first and second internal electrodes 121 and 122 alternately stacked with the dielectric layer 111 interposed therebetween, and including first and second surfaces 1 and 2 opposing each other in the layering direction, third and fourth surfaces 3 and 4 connected to the first and second surfaces 1 and 2 and opposing each other, and fifth and sixth surfaces 5 and 6 connected to the first to fourth surfaces 1 to 4 and opposing each other. The multilayer electronic component 100 may further comprise a first external electrode 131 including a first electrode layer 131a, a first conductive resin layer 131b, a first plating layer 131c, and a first additional plating layer 131d, disposed in order. The first external electrode 131 may include a first connection portion A1 disposed on the third surface of the body 110 and a first band portion B1 extending from the first connection portion A1 to a portion of each of the first, second, fifth, and sixth surfaces. The multilayer electronic component 100 may further comprise a second external electrode 132 including a second electrode layer 132a, a second conductive resin layer 132b, a second plating layer 132c, and a second additional plating layer 132d, disposed in order. The second external electrode 132 may include a second connection portion A2 disposed on the fourth surface of the body 110 and a second band portion B2 extending from the second connection portion A2 to a portion of each of the first, second, fifth, and sixth surfaces. The multilayer electronic component 100 may further comprise an Si-organic compound layer 140 including a body covering portion 143 disposed on a region of an exterior surface of the body 110 between the first and second external electrodes 131 and 132 (or on a region of the exterior surface of the body 110 in which the first and second external electrodes 131 and 132 are not disposed), a first extended portion 141 extending from the body covering portion 143 to a region between the first plating layer 131c and the first additional plating layer 131d of the first band portion B1, and a second extended portion 142 extending from the body covering portion 143 to a region between the second plating layer 132c and the second additional plating layer 132d of the second band portion B2.

In the body 110, the dielectric layer 111 and the internal electrodes 121 and 122 may be alternately stacked.

The body 110 may not be limited to any particular shape. As illustrated, the body 110 may have a hexahedral shape or a shape similar to a hexahedron. Due to contraction of a ceramic powder included in the body 110 during a sintering process, the body 110 may not have an exact hexahedral shape with straight lines, but may have a substantially hexahedral shape.

The body 110 may have first and second surfaces 1 and 2 opposing each other in a thickness direction (Z direction), third and fourth surfaces 3 and 4 connected to the first and second surfaces 1 and 2 and opposing each other in a width direction (Y direction), and fifth and sixth surfaces 5 and 6 connected to the first and second surfaces 1 and 2 and the third and fourth surfaces 3 and 4, and opposing each other in a length direction (X direction).

The plurality of the dielectric layers 111 forming the body 110 may be in a sintered state, and may be integrated such that boundaries between adjacent dielectric layers 111 may be difficult to identify without using a scanning electron microscope (SEM).

According to the exemplary embodiment, a material of the dielectric layer 111 may not be limited to any particular material as long as sufficient capacitance is able to be obtained therewith. For example, as the material, a barium titanate material, a Perovskite material compound with lead (Pb), a strontium titanate material, or the like, may be used. The barium titanate material may include a BaTiO3-based ceramic powder, and an example of the ceramic powder may include BaTiO3, (Ba1−xCax)TiO3, Ba(Ti1−yCay) O3, (Ba1−xCax) (Ti1−yZry)O3, Ba(Ti1−yZr)O3, or the like, in which calcium (Ca), zirconium (Zr), and the like, are partially solid-solute in BaTiO3, or the like.

As the material of the dielectric layer 111, various ceramic additives, organic solvents, plasticizers, coupling agents, dispersing agents, and the like, may be added in addition to power such as barium titanate (BaTiO3) powder, or the like, depending on an intended purpose.

The body 110 may include a capacitance forming portion disposed in the body 110 and forming capacitance including the first internal electrode 121 and the second internal electrode 122 opposing each other with the dielectric layer 111 interposed therebetween, an upper protective layer 112 disposed on the capacitance forming portion and a lower protective layer 113 disposed below the capacitance forming portion.

The capacitance forming portion may contribute to forming capacitance of the capacitor, and may be formed by alternatively layering the plurality of first and second internal electrodes 121 and 122 with the dielectric layer 111 interposed therebetween.

The upper protective layer 112 and the lower protective layer 113 may be formed by disposing a single dielectric layer or two or more dielectric layers on each of upper and lower surfaces of the capacitance forming portion, and may prevent damage to an internal electrode caused by physical or chemical stress.

The upper protective layer 112 and the lower protective layer 113 may not include an internal electrode, and may include a material the same as a material of the dielectric layer 111.

The plurality of internal electrodes 121 and 122 may oppose each other with the dielectric layer 111 interposed therebetween.

The internal electrodes 121 and 122 may include the first and second internal electrodes 121 and 122 alternately disposed with the dielectric layer 111 interposed therebetween and opposing each other.

The first and second internal electrodes 121 and 122 may be exposed to the third and fourth surfaces 3 and 4 of the body 110, respectively.

Referring to FIG. 2, the first internal electrode 121 may be spaced apart from the fourth surface 4 and may be exposed through the third surface 3. The second internal electrode 122 may be spaced apart from the third surface 3 and may be exposed through the fourth surface 4. The first external electrode 131 may be disposed on the third surface 3 of the body and may be connected to the first internal electrode 121, and the second external electrode 132 may be disposed on the fourth surface 4 of the body and may be connected to the second internal electrode 122.

The first internal electrode 121 may not be connected to the second external electrode 132 and may be connected to the first external electrode 131, and the second internal electrode 122 may not be connected to the first external electrode 131 and may be connected to the second external electrode 132. Accordingly, the first internal electrode 121 may be spaced apart from the fourth surface 4 by a certain distance, and the second internal electrode 122 may be spaced apart from the third surface 3 by a certain distance.

The first and second internal electrodes 121 and 122 may be electrically isolated from each other by the dielectric layer 111 interposed therebetween.

Referring to FIG. 3, the body 110 may be formed by alternatively layering the dielectric layer 111 on which the first internal electrode 121 is printed and the dielectric layer 111 on which the second internal electrode 122 is printed in the thickness direction (Z direction) and performing a sintering process.

A material for forming the first and second internal electrodes 121 and 122 may not be limited to any particular material. For example, the first and second internal electrodes 121 and 122 may be formed using a conductive paste including one or more of nickel (Ni), copper (Cu), palladium (Pd), silver (Ag), gold (Au), platinum (Pt), tin (Sn), tungsten (W), titanium (Ti), and alloys thereof.

As a method of printing the conductive paste, a screen-printing method, a gravure printing method, or the like, may be used, but the method is not limited thereto.

The external electrodes 131 and 132 may be disposed on the body 110, and may include the electrode layers 131a and 132a, the conductive resin layers 131b and 132b, the plating layers 131c and 132c, and the additional plating layers 131d and 132d. The extended portions 141 and 142 of the Si-organic compound layer 140 may be disposed between the plating layers 131c and 132c and the additional plating layers 131d and 132d.

The external electrodes 131 and 132 may include the first and second external electrodes 131 and 132 connected to the first and second internal electrodes 121 and 122, respectively.

The first external electrode 131 may include the first electrode layer 131a, the first conductive resin layer 131b, the first plating layer 131c, and the first additional plating layer 131d, and the second external electrode 132 may include the second electrode layer 132a, the second conductive resin layer 132b, the second plating layer 132c, and the second additional plating layer 132d.

When the first external electrode 131 is divided according to a position of the first external electrode 131, the first external electrode 131 may include the first connection portion A1 disposed on the third surface of the body, and the band portion B1 extending from the first connection portion A1 to a portion of each of the first, second, fifth, and sixth surfaces 1, 2, 5, and 6.

When the second external electrode 132 is divided according to a position of the second external electrode 132, the second external electrode 132 may include the second connection portion A2 disposed on the fourth surface 4 of the body, and the band portion B2 extending from the second connection portion A2 to a portion of each of the first, second, fifth, and sixth surfaces 1, 2, 5, and 6.

The first and second electrode layers 131a and 132a may be formed using a material having electrical conductivity such as a metal. A material of the first and second electrode layers 131a and 132a may be determined in consideration of electrical properties, structural stability, and the like.

For example, the first and second electrode layers 131a and 132a may include a conductive metal and glass.

A conductive metal included in the first and second electrode layers 131a and 132a may not be limited to any particular material as long as the material is able to be electrically connected to the internal electrode to form capacitance. For example, the conductive metal used for the electrode layers 131a and 132a may be one or more of nickel (Ni), copper (Cu), palladium (Pd), silver (Ag), gold (Au), platinum (Pt), tin (Sn), tungsten (W), titanium (Ti), and alloys thereof.

The electrode layers 131a and 132a may be formed by applying a conductive paste prepared by adding glass frit to the conductive metal powder, and performing a sintering process.

When the first and second electrode layers 131a and 132a include a conductive metal and glass, a thickness of a corner portion at which the connection portions A1 and A2 meet the band portions B1 and B2 may be decreased, or an air gap may be formed between ends of the band portions B1 and B2 and the body 110, which may degrade moisture reliability. Thus, the improvement of moisture reliability may be more effective when the first and second electrode layers 131a and 132a include a conductive metal and glass.

The first and second electrode layers 131a and 132a may be formed by an atomic layer deposition (ALD) method, a molecular layer deposition (MLD) method, a chemical vapor deposition (CVD) method, a sputtering method, or the like.

The first and second electrode layers 131a and 132a may also be formed by a method of transferring a sheet including a conductive metal on the body 110.

The conductive resin layers 131b and 132b may include a conductive metal and a base resin.

A conductive metal included in the conductive resin layers 131b and 132b may allow the conductive resin layers 131b and 132b to electrically connect to the electrode layers 131a and 132a.

A conductive metal included in the conductive resin layers 131b and 132b may not be limited to any particular material as long as the material is able to be electrically connected to the electrode layers 131a and 132a. For example, the conductive metal included in the conductive resin layers 131b and 132b may be one or more of nickel (Ni), copper (Cu), palladium (Pd), silver (Ag), gold (Au), platinum (Pt), tin (Sn), tungsten (W), titanium (Ti), and alloys thereof.

A conductive metal included in the conductive resin layers 131b and 132b may include one or more of spherical powder and flake powder. Accordingly, the conductive metal may only include flake powder, or may only include spherical powder, or may include a mixture of flake powder and spherical powder.

The spherical powder may also include power particles which do not have a completely spherical shape. For example, the spherical powder may include powder particles each having a length ratio between a major axis and a minor axis (a major axis/a minor axis) to be 1.45 or lower.

The flake powder may refer to powder particles each having a flat and elongated shape. A length ratio between a major axis and a minor axis (a major axis/a minor axis) of a particle of the flake powder may be 1.95 or higher, for example, although an exemplary embodiment thereof is not limited thereto.

A length of each of a major axis and a minor axis of a particle of the spherical powder and a particle of the flake powder may be measured from an image of a cross-sectional surface taken in an X and Z direction (L-T cross-sectional surface) of a central portion of the multilayer electronic component taken in a width (Y) direction, obtained using a scanning electron microscope (SEM).

A base resin included in the conductive resin layers 131b and 132b may secure adhesiveness and may absorb impacts.

A base resin included in the conductive resin layers 131b and 132b may not be limited to any particular material, and any material which has adhesiveness and impact absorption and may be used to make paste by being mixed with conductive metal powder may be used. For example, the base resin may be implemented by an epoxy resin.

The first and second plating layers 131c and 132c may improve mounting properties, and may electrically connect the conductive resin layers 131b and 132b to the additional plating layers 131d and 132d.

A type of the plating layers 131c and 132c may not be limited to any particular type. For example, the plating layers 131c and 132c may be configured as plating layers including one or more of Ni, Sn, Pd, and alloys thereof, or may include a plurality of layers.

The first and second additional plating layers 131d and 132d may improve mounting properties. Also, when warpage stress occurs, the first and second additional plating layers 131d and 132d may peel-off and may prevent warpage cracks.

The additional plating layers 131d and 132d may not be limited to any particular type. For example, the additional plating layers 131d and 132d may be configured as plating layers including one or more of Ni, Sn, Pd, and alloys thereof, or may include a plurality of layers.

For example, the plating layers 131c and 132c may be configured as Ni-plating layers and the additional plating layers 131d and 132d may be configured as Sn-plating layers.

The Si-organic compound layer 140 may include a body covering portion 143 disposed in a region of an exterior surface of the body in which the first and second external electrodes 131 and 132 are not disposed, a first extended portion 141 extending from the body covering portion 143 to a region between the first plating layer 131c and the first additional plating layer 131d of the first band portion B1, and a second extended portion 142 extending from the body covering portion 143 to a region between the second plating layer 132c and the second additional plating layer 132d of the second band portion B2.

The Si-organic compound layer 140 may prevent stress generated when a substrate is deformed by thermal/physical impacts while the multilayer electronic component 100 is mounted on the substrate from being propagated to the body 110 and may prevent cracks.

The Si-organic compound layer 140 may also block a moisture permeation route, thereby improve moisture reliability.

A base resin included in the conductive resin layers 131b and 132b may also absorb impacts. However, as the first conductive resin layer 131b and the second conductive resin layer 132b need to be disposed to be insulated from each other, there may be a limitation for the conductive resin layers 131b and 132b to absorb impacts.

The body covering portion 143 may not include a conductive metal and may have insulating properties. Accordingly, as the body covering portion 143 is disposed in a region of the exterior surface of the body in which the first and second external electrodes 131 and 132 are not disposed, the body covering portion 143 may be disposed in a greater area such that the body covering portion 143 may be effective for absorbing impacts and preventing propagation of stress.

The body covering portion 143 may also prevent permeation of moisture into the body through the exterior surface of the body 110 by sealing fine air gaps or cracks of the body 110.

The first extended portion 141 may extend to a region between the first plating layer 131c and the first additional plating layer 131d of the first band portion B1 from the body covering portion 143 and may prevent propagation of stress into the body 110 and may prevent cracks.

The first extended portion 141 may prevent an air gap between an end of the first plating layer 131c disposed on the first band portion B1 and the body 110, thereby improving moisture reliability.

The second extended portion 142 may extend to a region between the second plating layer 132c and the second additional plating layer 132d of the second band portion B2 from the body covering portion 143 and may prevent propagation of stress into the body 110 and may prevent cracks.

The second extended portion 142 may prevent an air gap between an end of the second plating layer 132c disposed on the second band portion B2 and the body 110, thereby improving moisture reliability.

As cohesion force between the extended portions 141 and 142 of the Si-organic compound layer 140 and the additional plating layers 131d and 132d is relatively low, when warpage stress occurs, the extended portions 141 and 142 may induce the peeling-off of the additional plating layers 131d and 132d such that the extended portions 141 and 142 may prevent warpage cracks.

The first and second extended portions 141 and 142 may include first and second openings H1 and H2 (e.g., through-holes) defined on the first and second extended portions 141 and 142, respectively.

When cohesion force between the extended portions 141 and 142 and the additional plating layers 131d and 132d are extremely low, the peeling-off may occur by even weak warpage stress such that it may be difficult to effectively prevent warpage cracks.

Thus, by including the first and second openings H1 and H2, the additional plating layers 131d and 132d may be in contact with the plating layers 131c and 132c through the first and second openings H1 and H2 such that cohesion force may be secured, and warpage cracks may be effectively prevented.

The Si-organic compound layer 140 may be formed by forming the electrode layers 131a and 132a, the conductive resin layers 131b and 132b, and the plating layers 131c and 132c on the body 110 including the dielectric layer and the internal layers, forming the Si-organic compound layer 140 on the exposed exterior surface of the body 110 and the plating layers 131c and 132c, and removing the Si-organic compound layer 140 formed on the connection portions A1 and A2 of the plating layers 131c and 132c.

As a method of removing the Si-organic compound layer 140 disposed on the connection portions A1 and A2, a method such as a laser process, a mechanical grinding method, a dry etching method, a wet etching method, a shadowing deposition method using a tape protective layer, or the like, may be used. Also, by partially removing the Si-organic compound layer 140 formed on the band portions B1 and B2 during a process of removing the Si-organic compound layer 140 formed on the connection portions A1 and A2, the openings H1 and H2 may be defined in the extended portions 141 and 142.

The Si-organic compound layer 140 may include alkoxy silane.

Accordingly, the Si-organic compound layer 140 may have a form of a polymer including a plurality of silicon carbide linkage structures and may have hydrophobicity.

Alkoxy silane may prevent permeation of moisture and contamination, may protect a product and may increase durability by permeating various inorganic substrates and being cured. Alkoxy silane may also react with a hydroxyl group (OH) and may form strong chemical linkage such that reliability may improve.

Also, as compared to an epoxy resin or an inorganic compound, an epoxy resin may not have an hydrophobic effect such that an epoxy resin may not be able to effectively prevent permeation of moisture, and when an epoxy resin is cured, a great amount of $CO_2$ gas may be created such that an air gap may be created. As an inorganic compound does not have a functional group which may react with a hydroxy group when being applied on a surface of the body, an inorganic compound may not be adhered to the surface of the body and a chemical linkage may not be formed such that it may be difficult to apply an inorganic compound to exemplary embodiments of the multilayer electronic component.

Thus, as the Si-organic compound layer 140 includes alkoxy silane, the effect of sealing fine air-gaps and cracks may improve, and warpage stress and moisture reliability may improve.

When a thickness of the first conductive resin layer 131b on the first electrode layer 131a of the first band portion B1 is defined as Ta, and a thickness of the first extended portion 141 is defined as Tb, Tb/Ta may be 0.5 or higher and 0.9 or lower.

FIG. 4 is an enlarged diagram illustrating region P illustrated in FIG. 2. In the description below, a thickness of each of the first conductive resin layer 131b and the first extended portion 141 on the first electrode layer 131a of the first band portion B1 will be described in greater detail with reference to FIG. 4. The example embodiment may also be applied to a thickness of each of the second conductive resin layer 132b and the second extended portion 142 on the second electrode layer 132a of the second band portion B2.

Sample chips were manufactured while changing a ratio (Tb/Ta) of the thickness Tb of the first extended portion 141 to the thickness Ta of the first conductive resin layer 131b on the first electrode layer 131a of the first band portion B1, warpage stress and equivalent series resistance (ESR) were assessed, and results of the assessment are listed in Table 1 and Table 2.

As for warpage strength, a warpage strength measuring method through a piezoelectric effect was used. Samples of the multilayer ceramic capacitors were mounted on a substrate, a distance from a central portion at which pressure was applied when the samples were bent was determined to be 6 mm, whether cracks were created in the sample chip was observed, and among the total sample chips, the number of sample chips in which cracks were created was listed.

As for the ESR assessment, a process in which the sample chips were maintained at −55° C. for 30 minutes, the temperature was increased to 125° C., and the sample chips were maintained for 30 minutes at the increased temperature was determined as a single cycle, and 500 cycles were applied. The sample chips in which the ESR exceeded 50 mΩ were determined as being defective. Among the total sample chips, the number of sample chips in which the ESR was defective is listed.

TABLE 1

Warpage Assessment

| No. | Tb/Ta | A Lot | B Lot | C Lot | D Lot | E Lot | Total |
|---|---|---|---|---|---|---|---|
| 1 | 0.3 | 2/60 | 0/60 | 1/60 | 0/60 | 1/60 | 4/300 |
| 2 | 0.5 | 0/60 | 0/60 | 0/60 | 0/60 | 0/60 | 0/300 |
| 3 | 0.7 | 0/60 | 0/60 | 0/60 | 0/60 | 0/60 | 0/300 |
| 4 | 0.9 | 0/60 | 0/60 | 0/60 | 0/60 | 0/60 | 0/300 |
| 5 | 1.1 | 0/60 | 0/60 | 0/60 | 0/60 | 0/60 | 0/300 |
| 6 | 1.3 | 0/60 | 0/60 | 0/60 | 0/60 | 0/60 | 0/300 |

Referring to Table 1, in test No. 1 in which Tb/Ta was 0.3, cracks were created in four sample chips among 300 sample chips.

In test Nos. 2 to 6 in which Tb/Ta was 0.5 or higher, the number of sample chip in which cracks were created was 0, which indicates that warpage strength was excellent.

TABLE 2

ESR Assessment

| No. | Tb/Ta | A Lot | B Lot | C Lot | D Lot | E Lot | Total |
|---|---|---|---|---|---|---|---|
| 1 | 0.3 | 0/320 | 0/320 | 0/320 | 0/320 | 0/320 | 0/1600 |
| 2 | 0.5 | 0/320 | 0/320 | 0/320 | 0/320 | 0/320 | 0/1600 |
| 3 | 0.7 | 0/320 | 0/320 | 0/320 | 0/320 | 0/320 | 0/1600 |
| 4 | 0.9 | 0/320 | 0/320 | 0/320 | 0/320 | 0/320 | 0/1600 |
| 5 | 1.1 | 0/320 | 2/320 | 4/320 | 0/320 | 0/320 | 6/1600 |
| 6 | 1.3 | 0/320 | 2/320 | 0/320 | 3/320 | 0/320 | 5/1600 |

Referring to Table 2 above, in test No. 5 in which Tb/Ta was 1.1, the ESR defect occurred in six sample chips among 1500 sample chips. In test No. 6 in which Tb/Ta was 1.3, the ESR defect occurred in five sample chips among 1600 sample chips.

In test Nos. 1 to 4 in which Tb/Ta was 0.9 or lower, the number of sample chips in which the ESR defect occurred was 0, which indicates that ESR properties were excellent.

Thus, to secure excellent ESR properties while improving warpage strength, a preferable ratio (Tb/Ta) of the thickness Tb of the first extended portion 141 to the thickness Ta of the first conductive resin layer 131*b* on the first electrode layer 131*a* was 0.5 or higher and 0.9 or lower.

Figure 5:
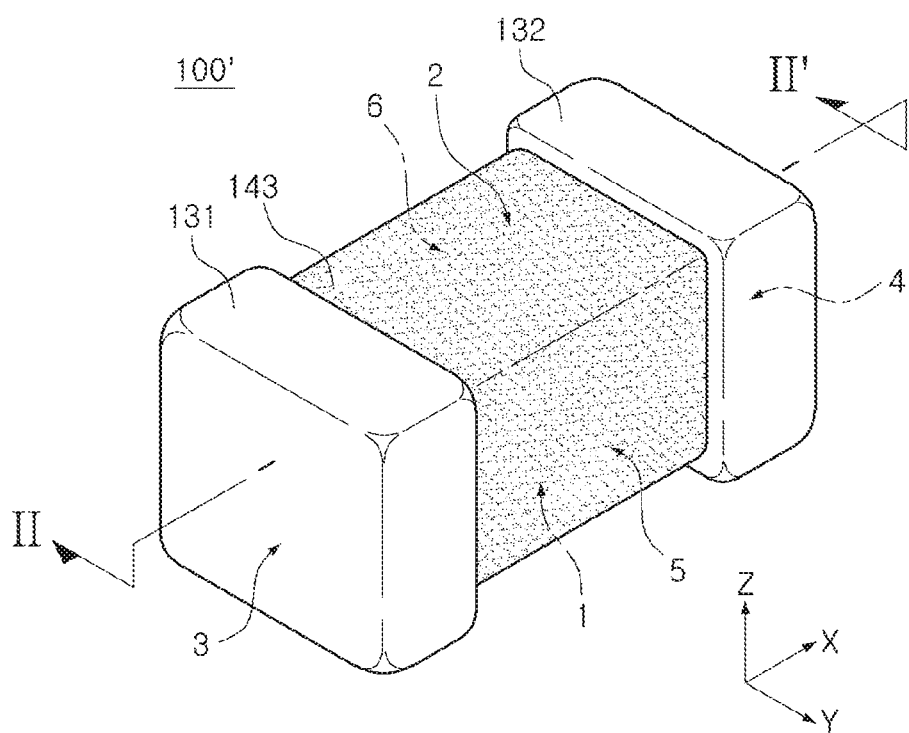
FIG. 5 is a perspective diagram illustrating a multilayer electronic component according to an exemplary embodiment of the present disclosure.

FIG. 5 is a perspective diagram illustrating a multilayer electronic component according to an example embodiment.

Figure 6:
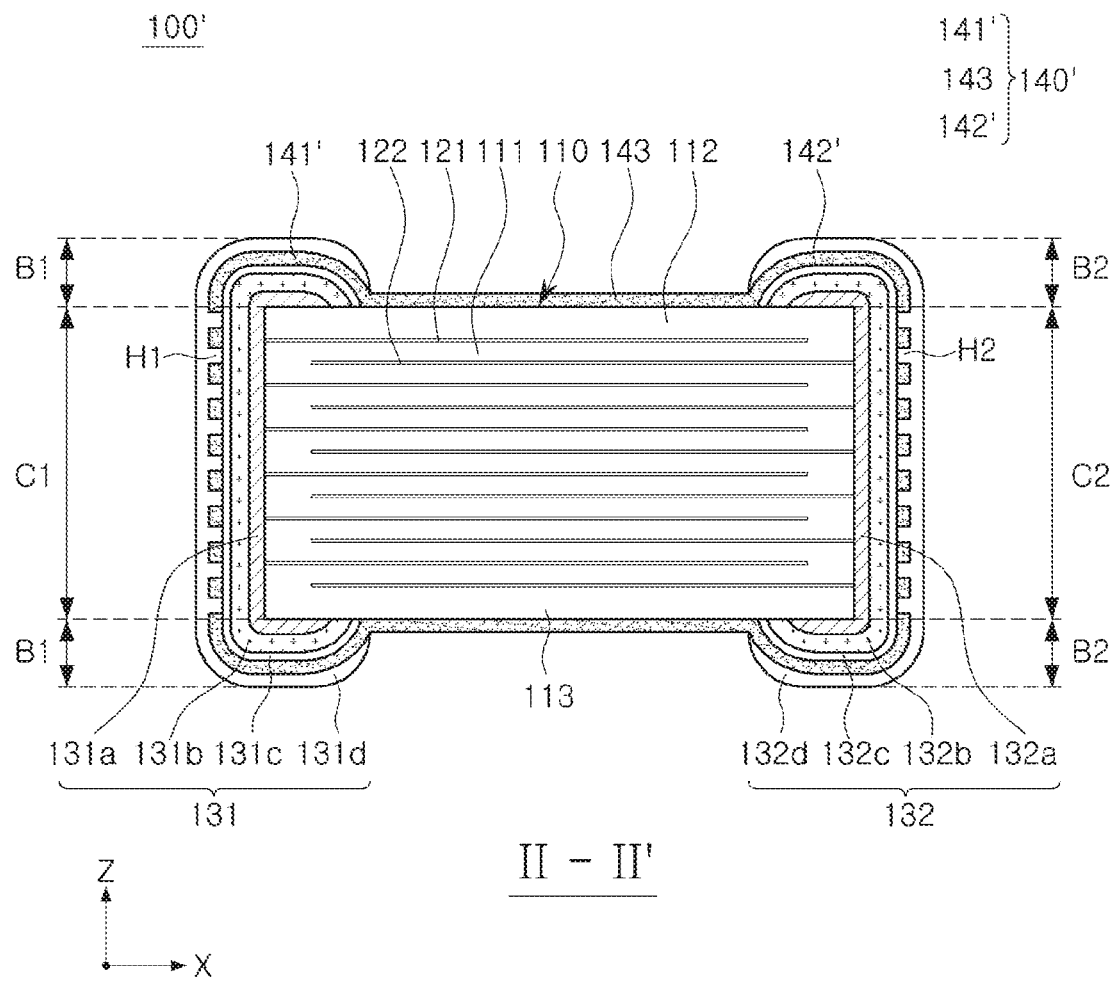
FIG. 6 is a cross-sectional diagram along line II-II' in FIG. 5.

FIG. 6 is a cross-sectional diagram along line II-II' in FIG. 5.

Figure 7:
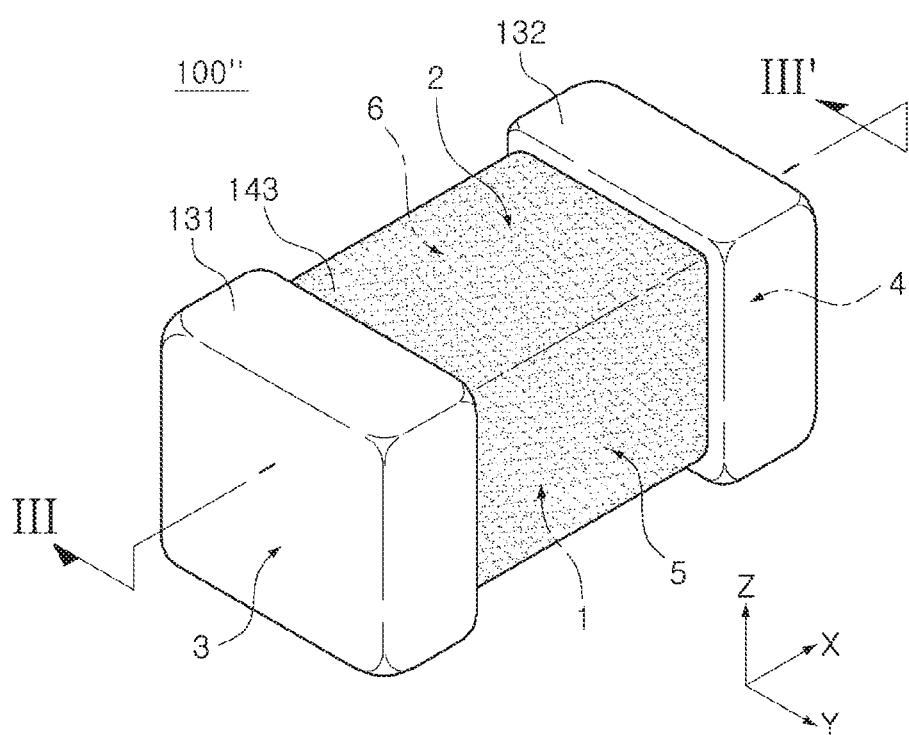
FIG. 7 is a perspective diagram illustrating a modified example of a multilayer electronic component.

FIG. 7 is a perspective diagram illustrating a modified example of a multilayer electronic component.

Figure 8:
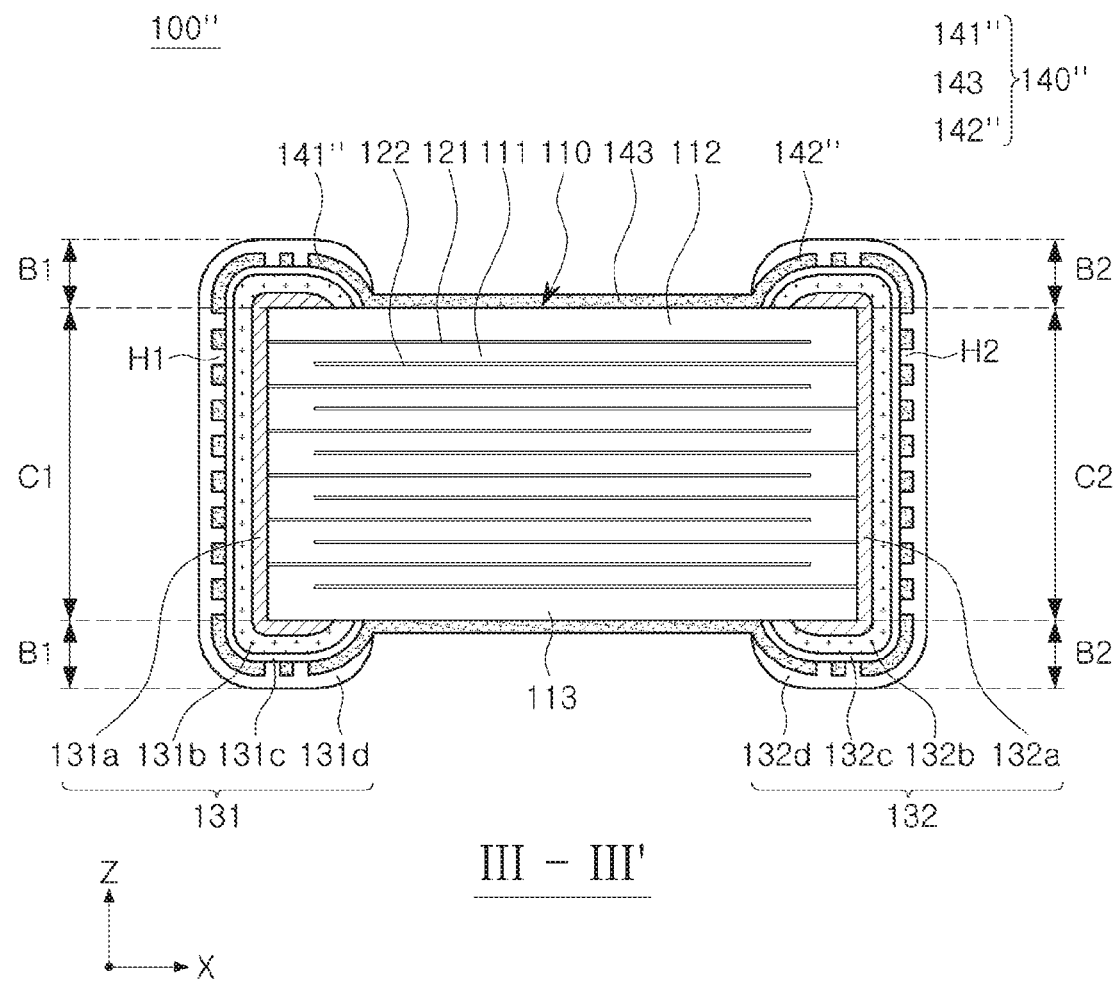
FIG. 8 is a cross-sectional diagram along line III-III' in FIG. 7.

FIG. 8 is a cross-sectional diagram along line III-III' in FIG. 7.

In the description below, the multilayer electronic component 100' and a modified example of the multilayer electronic component 100' will be described with reference to FIGS. 5 to 8. To avoid overlapping descriptions, the descriptions of the elements the same as the elements of the multilayer electronic component 100 will not be provided.

A multilayer electronic component 100' in another exemplary embodiment may comprise a body 110 including a dielectric layer 111 and first and second internal electrodes 121 and 122 alternately stacked with the dielectric layer 111 interposed therebetween, and including first and second surfaces 1 and 2 opposing each other in the layering direction, third and fourth surfaces 3 and 4 connected to the first and second surfaces 1 and 2 and opposing each other, and fifth and sixth surfaces 5 and 6 connected to the first to fourth surfaces 1 to 4 and opposing each other. The multilayer electronic component 100' may further comprise a first external electrode 131 including a first electrode layer 131*a*, a first conductive resin layer 131*b*, a first plating layer 131*c*, and a first additional plating layer 131*d*, disposed in order, and including a first connection portion A1 disposed on the third surface of the body 110 and a first band portion B1 extending from the first connection portion A1 to a portion of each of the first, second, fifth, and sixth surfaces. The multilayer electronic component 100' may further comprise a second external electrode 132 including a second electrode layer 132*a*, a second conductive resin layer 132*b*, a second plating layer 132*c*, and a second additional plating layer 132*d*, disposed in order, and including a second connection portion A2 disposed on the fourth surface of the body 110 and a second band portion B2 extending from the second connection portion A2 to a portion of each of the first, second, fifth, and sixth surfaces. The multilayer electronic component 100' may further comprise an Si-organic compound layer 140' including a body covering portion 143 disposed in a region of an exterior surface of the body in which the first and second external electrodes 131 and 132 are not disposed, a first extended portion 141' extending from the body covering portion to a region between the first plating layer 131*c* and the first additional plating layer 131*d*, and a second extended portion 142' extending from the body covering portion to a region between the second plating layer 132*c* and the second additional plating layer 132*d*. First and second openings H1 and H2 may be disposed in the first and second extended portions 141' and 142', respectively. Each of the first and second openings H1 and H2 may include a plurality of discrete openings spaced apart from one another.

The first additional plating layer 131*d* may be in contact with the first plating layer 131*c* through the first opening H1, and the second additional plating layer 132*d* may be in contact with the second plating layer 132*c* through the second opening H2. Accordingly, the first opening H1 may be filled with the first additional plating layer 131*d*, and the second opening H2 may be filled with the second additional plating layer 132*d*.

The Si-organic compound layer 140' may be formed by forming the electrode layers 131*a* and 132*a*, the conductive resin layers 131*b* and 132*b*, and the plating layers 131*c* and 132*c* on the body 110 including dielectric layers and internal electrodes, forming the Si-organic compound layer on an exposed exterior surface of the body 110 and on the plating layers 131*c* and 132*c*, partially removing the Si-organic compound layer formed on the plating layers 131*c* and 132*c*, and forming the first and second openings H1 and H2.

As a method for removing a region in which the openings H1 and H2 are formed, a method such as a laser process, a mechanical grinding method, a dry etching method, a wet etching method, a shadowing deposition method using a tape protective layer, or the like, may be used.

An area of the first opening H1 may be 20 to 90% of an area of the first extended portion 141', and an area of the second opening H2 may be 20 to 90% of an area of the second extended portion 142'.

When an area of the first opening H1 is less than 20% of an area of the first extended portion 141', electrical connectivity between the first plating layer 131*c* and the first additional plating layer 131*d* may decrease such that ESR may increase. When an area of the first opening H1 exceeds 90% of an area of the first extended portion 141', the effect of improvement in warpage strength and moisture reliability of the Si-organic compound layer 140' may be insufficient.

When an area of the second opening H2 is less than 20% of an area of the second extended portion 142', electrical connectivity between the second plating layer 132c and the second additional plating layer 132d may decrease such that ESR may increase. When an area of the second opening H2 exceeds 90% of an area of the second extended portion 142', the effect of improvement in warpage strength and moisture reliability of the Si-organic compound layer 140' may be insufficient.

The first opening H1 may be disposed in one or more of the first band portion B1 and the first connection portion A1 of the first electrode layer, and the second opening H2 may be disposed in one or more of the second band portion B2 and the second connection portion A2.

As illustrated in FIG. 6, in the first extended portion 141', the first opening H1 may be disposed only in the first connection portion A1, and in the second extended portion 142', the second opening H2 may be disposed only in the second connection portion A2.

Also, as illustrated in FIG. 8, in a first extended portion A1'', the first opening H1 may be disposed in both of the first connection portion A1 and the first band portion B1, and in a second extended portion 142'', the second opening H2 may be disposed in both of the second connection portion A2 and the second band portion B2.

Shapes of the openings H1 and H2 and the number of the openings H1 and H2 may not be limited to any particular examples. For example, each of the openings H1 and H2 may have a circular shape, a rectangular shape, an oval shape, a rectangular shape having rounded corners, or the like, or may have an irregular shape.

According to the aforementioned example embodiments, by including the Si-organic compound layer including the body covering portion disposed in a region of an exterior surface of the body in which the external electrodes are not disposed and the extended portion extending from the body covering portion to a region between the plating layer and the additional plating layer of the external electrode, warpage may improve.

Also, by including the Si-organic compound layer, moisture reliability may improve.

While the exemplary embodiments have been shown and described above, it will be apparent to those skilled in the art that modifications and variations could be made without departing from the scope of the present invention as defined by the appended claims.

What is claimed is:

1. A multilayer electronic component, comprising:
    a body including a dielectric layer and first and second internal electrodes alternately stacked with the dielectric layer interposed therebetween, the body including first and second surfaces opposing each other in a stacking direction of the first and second internal electrodes, third and fourth surfaces opposing each other and connected to the first and second surfaces, and fifth and sixth surfaces opposing each other and connected to the first to fourth surfaces;
    a first external electrode including a first connection portion disposed on the third surface of the body and a first band portion extending from the first connection portion onto at least a portion of each of the first, second, fifth, and sixth surfaces, wherein each of said first connection portion and said first band portion includes a first electrode layer, a first conductive resin layer, a first plating layer, and a first additional plating layer, arranged in order on an exterior of the body;
    a second external electrode including a second connection portion disposed on the fourth surface of the body and a second band portion extending from the second connection portion onto at least a portion of each of the first, second, fifth, and sixth surfaces, wherein each of said second connection portion and said second band portion includes a second electrode layer, a second conductive resin layer, a second plating layer, and a second additional plating layer, disposed in order on the body; and
    an Si-organic compound layer including a body covering portion disposed on a region of an exterior surface of the body between the first and second external electrodes, a first extended portion extending from the body covering portion to a region between the first plating layer and the first additional plating layer of the first band portion, and a second extended portion extending from the body covering portion to a region between the second plating layer and the second additional plating layer of the second band portion.

2. The multilayer electronic component of claim 1, wherein the Si-organic compound layer includes alkoxy silane.

3. The multilayer electronic component of claim 1, wherein Tb/Ta is 0.5 or higher and 0.9 or lower, where a thickness of the first conductive resin layer on the first electrode layer of the first band portion is defined as 'Ta', and a thickness of the first extended portion is defined as 'Tb'.

4. The multilayer electronic component of claim 1, wherein the first and second conductive resin layers include a conductive metal and a base resin.

5. The multilayer electronic component of claim 1, wherein the first and second electrode layers include a conductive metal and glass.

6. The multilayer electronic component of claim 1, wherein the first and second plating layers are configured as Ni-plating layers, and the first and second additional plating layers are configured as Sn-plating layers.

7. The multilayer electronic component of claim 1, further comprising:
    first and second openings defined on the first and second extended portions, respectively.

8. The multilayer electronic component of claim 7, wherein the first and second additional plating layers are in contact with the first and second plating layers through the first and second openings, respectively.

9. The multilayer electronic component of claim 1, wherein the first extended portion of the Si-organic compound layer does not extend between the first plating layer and first additional plating layer of the first connection portion, and
    the second extended portion of the Si-organic compound layer does not extend between the second plating layer and second additional plating layer of the second connection portion.

10. The multilayer electronic component of claim 1, wherein the body covering portion is disposed on the first, second, fifth, and sixth surfaces of the body between the first and second external electrodes.

11. The multilayer electronic component of claim 1, wherein the body covering portion is disposed on the first, second, fifth, and sixth surfaces of the body between the first and second external electrodes, and Tb/Ta is 0.5 or higher and 0.9 or lower, where a thickness of the first conductive resin layer on the first electrode layer of the first band portion is defined as 'Ta', and a thickness of the first extended portion is defined as 'Tb'.

12. The multilayer electronic component of claim 1, wherein the body covering portion is disposed on the first, second, fifth, and sixth surfaces of the body between the first and second external electrodes,
the first extended portion extends to at least a portion of a region between the first plating layer and the first additional plating layer of the first connection portion, and
the second extended portion extends to at least a portion of a region between the second plating layer and the second additional plating layer of the second connection portion.

13. The multilayer electronic component of claim 1, wherein the body covering portion is disposed on the first, second, fifth, and sixth surfaces of the body between the first and second external electrodes,
the first extended portion extends to at least a portion of a region between the first plating layer and the first additional plating layer of the first connection portion,
the second extended portion extends to at least a portion of a region between the second plating layer and the second additional plating layer of the second connection portion, and
Tb/Ta is 0.5 or higher and 0.9 or lower, where a thickness of the first conductive resin layer on the first electrode layer of the first band portion is defined as 'Ta', and a thickness of the first extended portion is defined as 'Tb'.

14. A multilayer electronic component, comprising:
a body including a dielectric layer and first and second internal electrodes alternately stacked with the dielectric layer interposed therebetween, the body including first and second surfaces opposing each other in a stacking direction of the first and second internal electrodes, third and fourth surfaces opposing each other and connected to the first and second surfaces, and fifth and sixth surfaces opposing each other and connected to the first to fourth surfaces;
a first external electrode including a first electrode layer, a first conductive resin layer, a first plating layer, and a first additional plating layer, arranged in order on an exterior of the body, the first external electrode including a first connection portion disposed on the third surface of the body and a first band portion extending from the first connection portion onto at least a portion of each of the first, second, fifth, and sixth surfaces;
a second external electrode including a second electrode layer, a second conductive resin layer, a second plating layer, and a second additional plating layer, arranged in order on an exterior of the body, the second external electrode including a second connection portion disposed on the fourth surface of the body and a second band portion extending from the second connection portion onto at least a portion of each of the first, second, fifth, and sixth surfaces;
an Si-organic compound layer including a body covering portion disposed on a region of an exterior surface of the body between the first and second external electrodes, a first extended portion extending from the body covering portion to a region between the first plating layer and the first additional plating layer, and a second extended portion extending from the body covering portion to a region between the second plating layer and the second additional plating layer; and
first and second openings defined on the first and second extended portions, respectively.

15. The multilayer electronic component of claim 14, wherein an area of the first opening is 20 to 90% of an area of the first extended portion, and
wherein an area of the second opening is to 20 to 90% of an area of the second extended portion.

16. The multilayer electronic component of claim 14, wherein the first opening is disposed in at least one of the first band portion or the first connection portion, and the second opening is disposed in at least one of the second band portion or the second connection portion.

17. The multilayer electronic component of claim 14, wherein the Si-organic compound layer includes alkoxy silane.

18. The multilayer electronic component of claim 14, wherein Tb/Ta is 0.5 or higher and 0.9 or lower, where a thickness of the first conductive resin layer on the first electrode layer of the first band portion is defined as 'Ta', and a thickness of the first extended portion is defined as 'Tb'.

19. The multilayer electronic component of claim 14, wherein the first and second conductive resin layers include a conductive metal and a base resin.

20. The multilayer electronic component of claim 14, wherein the first and second electrode layers include a conductive metal and glass.

21. The multilayer electronic component of claim 14, wherein the first and second plating layers are configured as Ni-plating layers, and the first and second additional plating layers are configured as Sn-plating layers.

22. The multilayer electronic component of claim 14, wherein the first and second additional plating layers are in contact with the first and second plating layers through the first and second openings, respectively.

23. The multilayer electronic component of claim 14, wherein each of the first and second openings includes a plurality of discrete openings spaced apart from one another.

24. The multilayer electronic component of claim 14, wherein the body covering portion is disposed on the first, second, fifth, and sixth surfaces of the body between the first and second external electrodes.

25. The multilayer electronic component of claim 14, wherein the body covering portion is disposed on the first, second, fifth, and sixth surfaces of the body between the first and second external electrodes, and
Tb/Ta is 0.5 or higher and 0.9 or lower, where a thickness of the first conductive resin layer on the first electrode layer of the first band portion is defined as 'Ta', and a thickness of the first extended portion is defined as 'Tb'.

26. The multilayer electronic component of claim 14, wherein the body covering portion is disposed on the first, second, fifth, and sixth surfaces of the body between the first and second external electrodes,
the first extended portion extends to at least a portion of a region between the first plating layer and the first additional plating layer of the first connection portion, and
the second extended portion extends to at least a portion of a region between the second plating layer and the second additional plating layer of the second connection portion.

27. The multilayer electronic component of claim 14, wherein the body covering portion is disposed on the first, second, fifth, and sixth surfaces of the body between the first and second external electrodes,
the first extended portion extends to at least a portion of a region between the first plating layer and the first additional plating layer of the first connection portion,
the second extended portion extends to at least a portion of a region between the second plating layer and the second additional plating layer of the second connection portion, and
Tb/Ta is 0.5 or higher and 0.9 or lower, where a thickness of the first conductive resin layer on the first electrode layer of the first band portion is defined as 'Ta', and a thickness of the first extended portion is defined as 'Tb'.

* * * * *